No. 871,086. PATENTED NOV. 12, 1907.
W. O. DUNTLEY & G. H. HAYES.
ENGINE.
APPLICATION FILED JUNE 19, 1901.
6 SHEETS—SHEET 3.
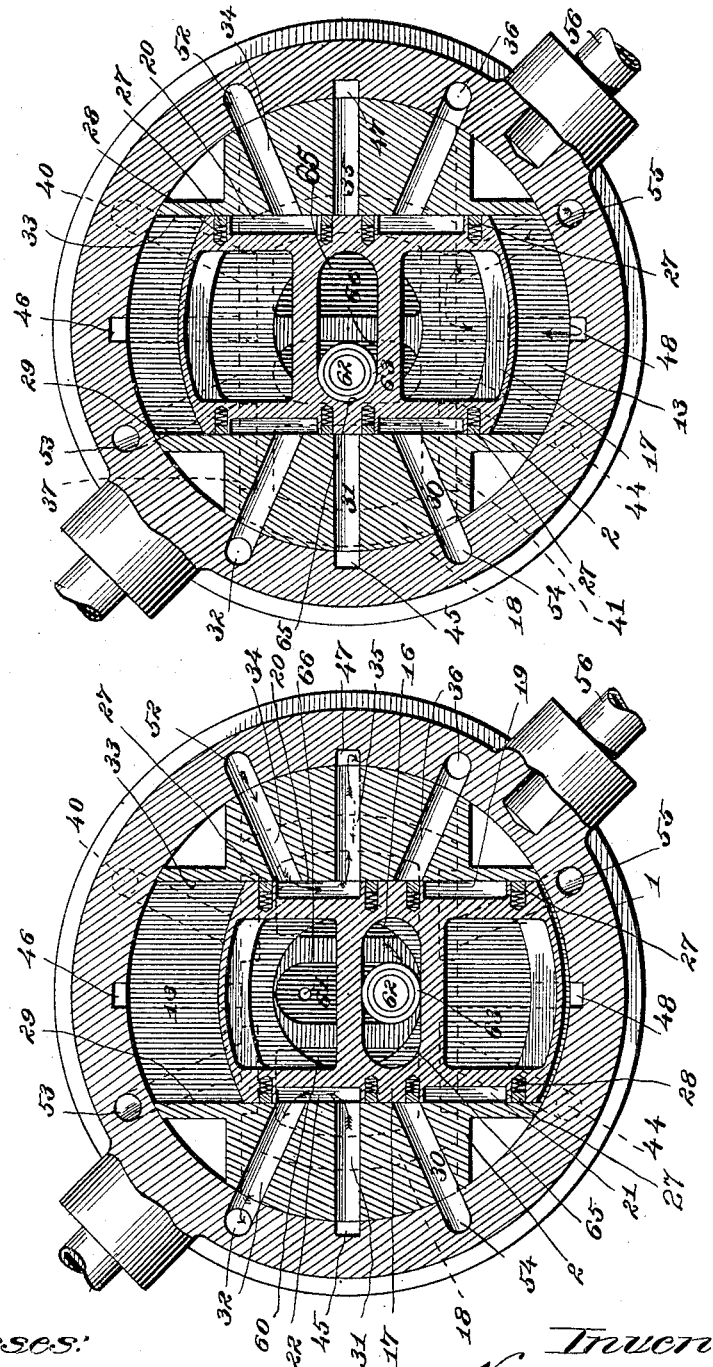

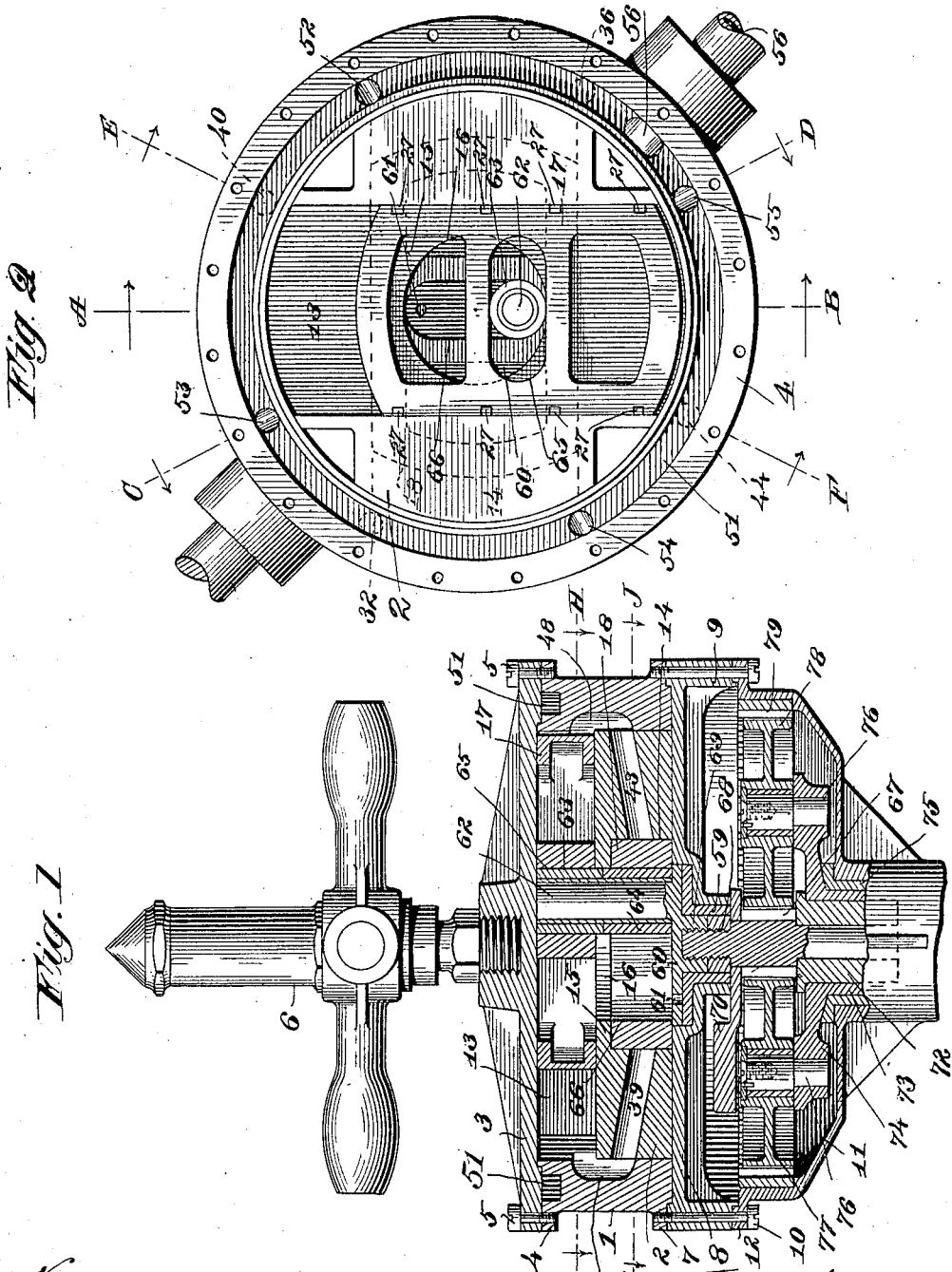

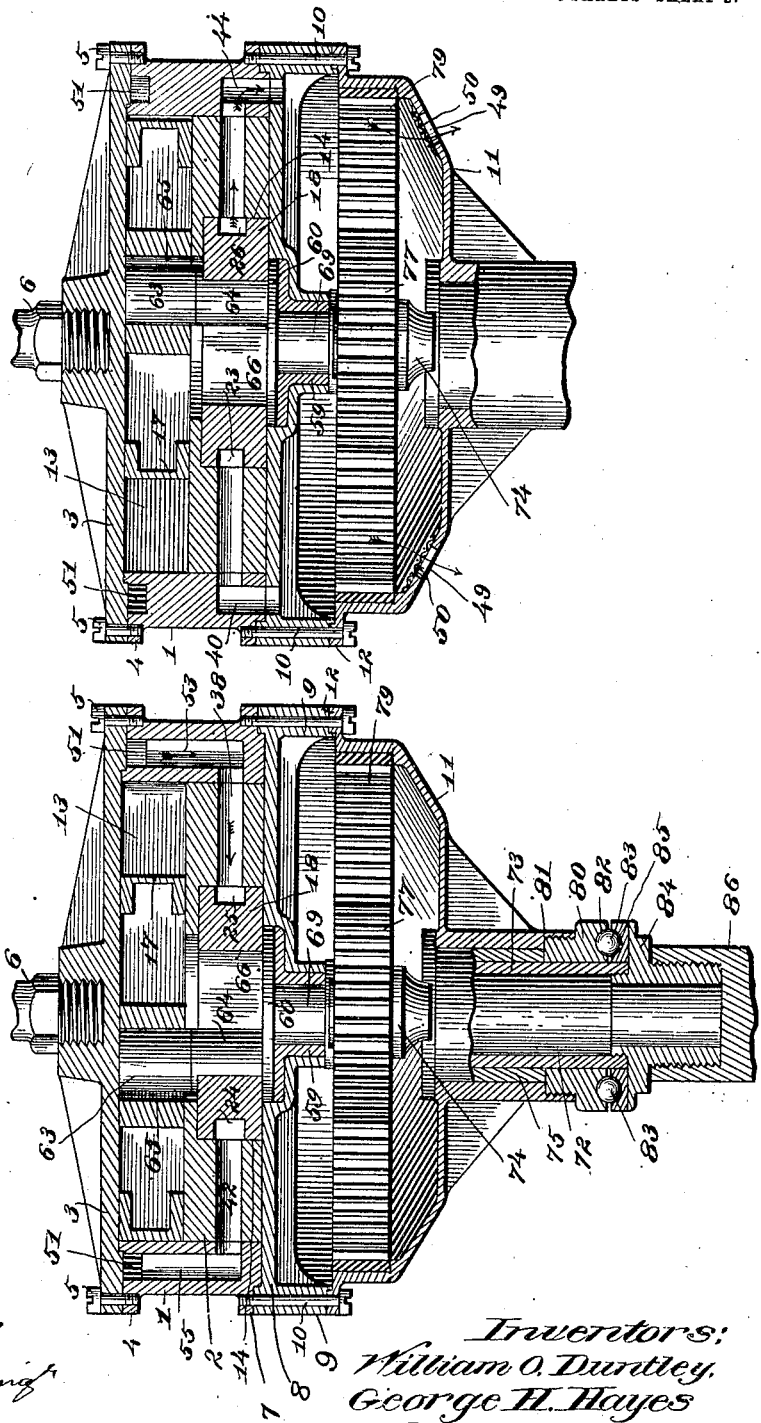

No. 871,086.

PATENTED NOV. 12, 1907.

W. O. DUNTLEY & G. H. HAYES.
ENGINE.
APPLICATION FILED JUNE 19, 1901.

6 SHEETS—SHEET 4.

Witnesses:
J. H. Glendening
G. A. Vauberschmidt

Inventors:
William O. Duntley
George H. Hayes
by Rector & Hibben
Attorneys.

No. 871,086. PATENTED NOV. 12, 1907.
W. O. DUNTLEY & G. H. HAYES.
ENGINE.
APPLICATION FILED JUNE 19, 1901.
6 SHEETS—SHEET 5.
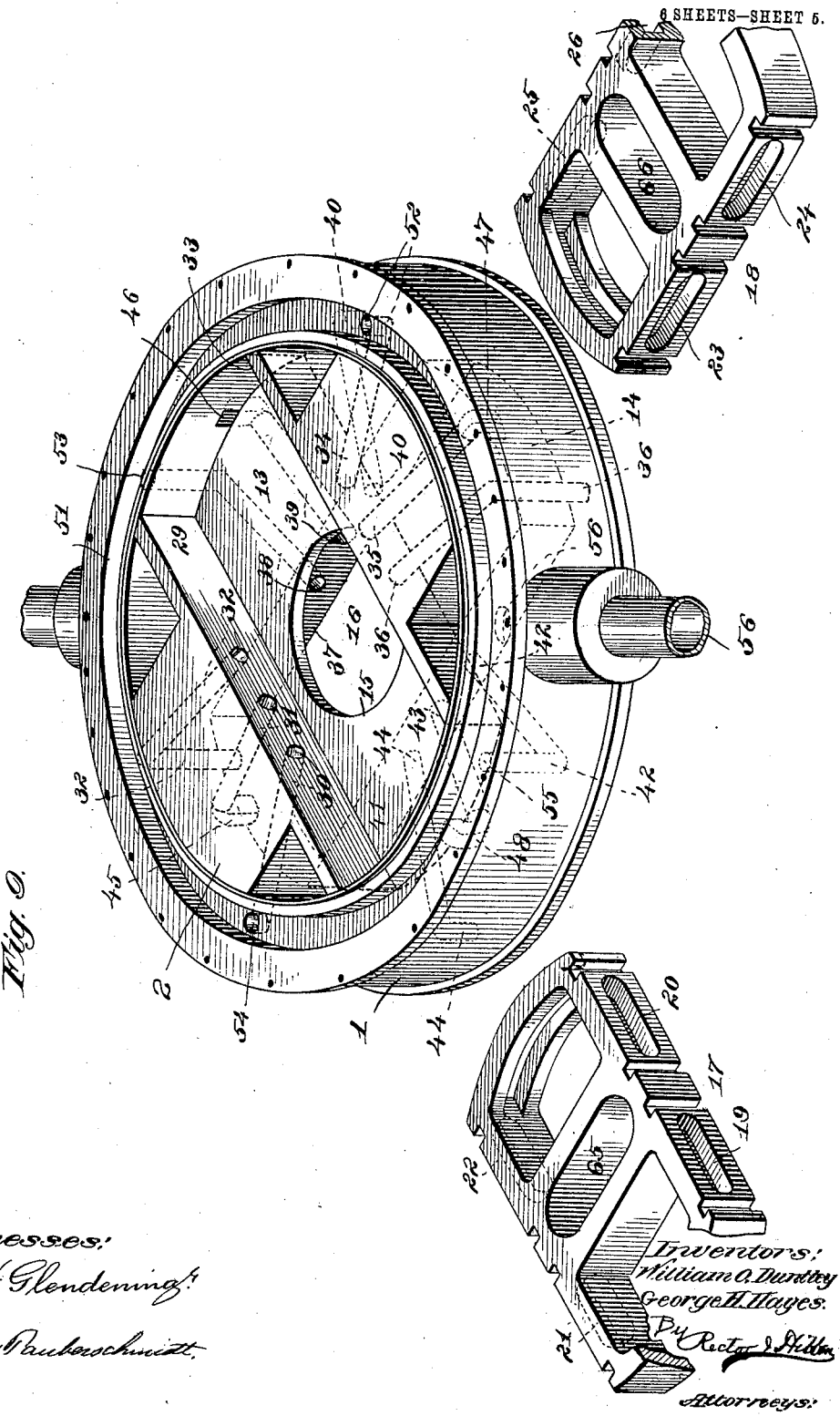

No. 871,086.
PATENTED NOV. 12, 1907.
W. O. DUNTLEY & G. H. HAYES.
ENGINE.
APPLICATION FILED JUNE 19, 1901.
6 SHEETS—SHEET 6.
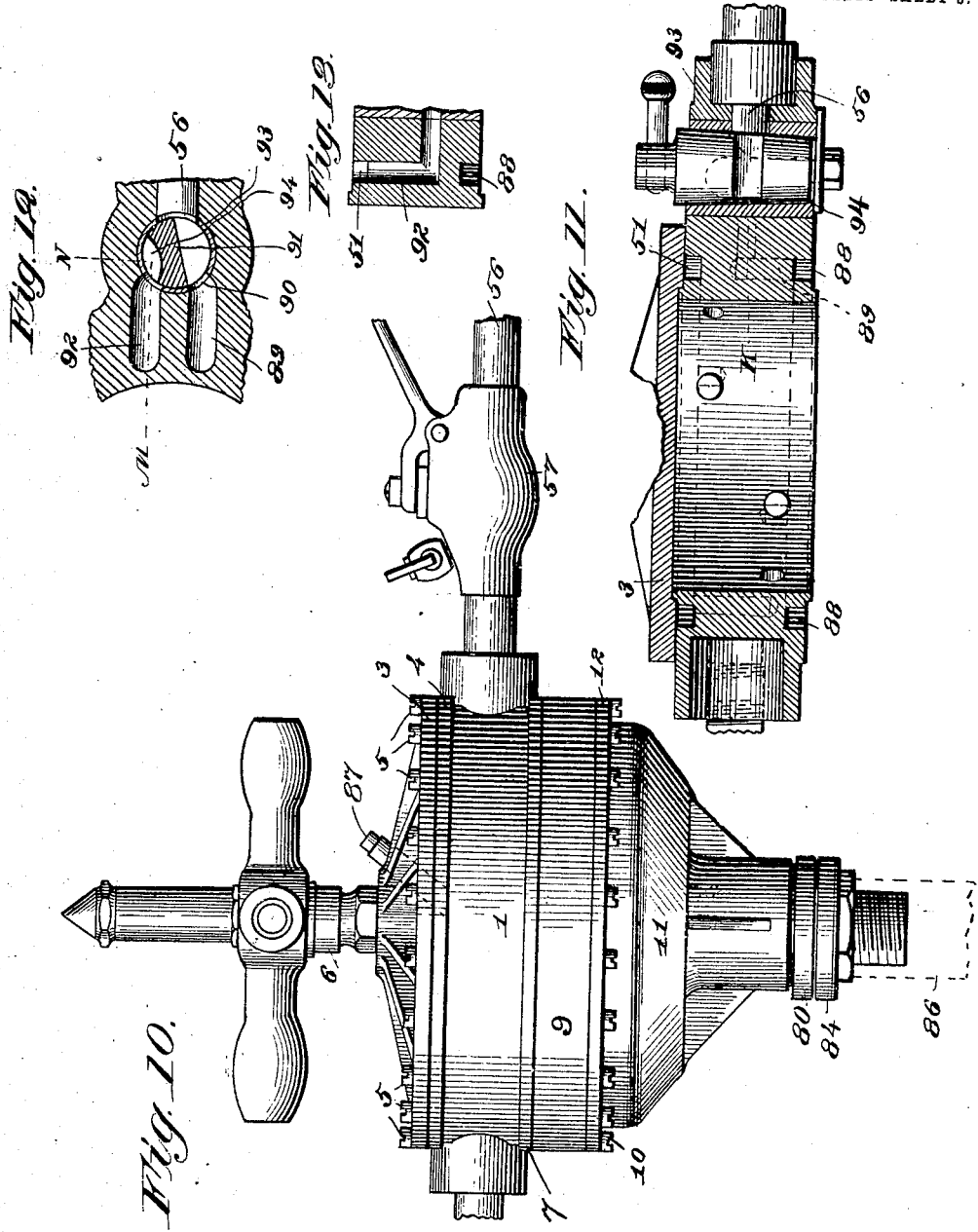
Witnesses:
J. H. Glendenning
G. A. Vaubenschmitt
Inventors,
William O. Duntley
George H. Hayes.
by Rector & Hibben
Attorneys.

UNITED STATES PATENT OFFICE.

WILLIAM O. DUNTLEY, OF CHICAGO, ILLINOIS, AND GEORGE H. HAYES, OF PHILADELPHIA, PENNSYLVANIA, ASSIGNORS, BY MESNE ASSIGNMENTS, TO CHICAGO PNEUMATIC TOOL COMPANY, A CORPORATION OF NEW JERSEY.

ENGINE.

No. 871,086.  Specification of Letters Patent.  Patented Nov. 12, 1907.

Application filed June 19, 1901. Serial No. 65,128.

To all whom it may concern:

Be it known that we, WILLIAM O. DUNTLEY, residing at Chicago, Cook county, Illinois, and GEORGE H. HAYES, residing at Philadelphia, Philadelphia county, Pennsylvania, have invented certain new and useful Improvements in Engines or Motors, of which the following is a specification.

Our invention relates to engines or motors and the like and the object thereof is the production of a simple, efficient and compact device of this character, both of the reversible and non-reversible types.

In general terms, our engine comprises a plurality of pistons which work in separate chambers and actuate the crank with which they have a loose engagement or rolling contact as distinguished from a positive connection. These pistons in addition to serving as pistons proper also serve as cut off valves for each other.

The advantageous features of construction and operation of our engine will be fully understood from the description hereinafter given.

Figure 8:
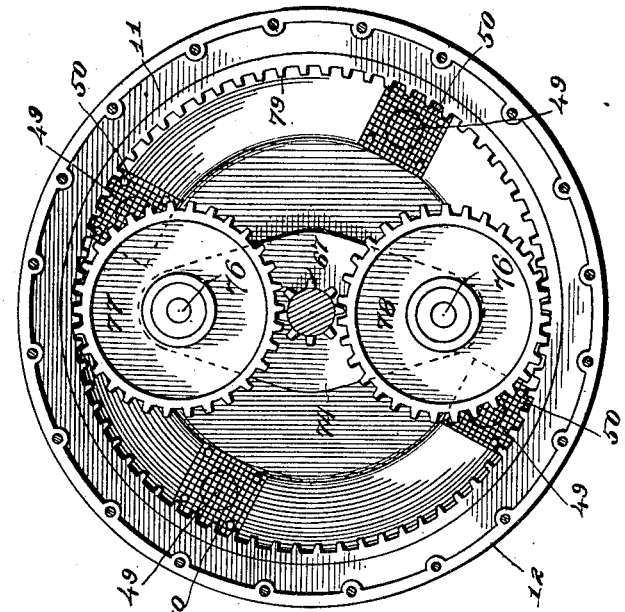
Figure 7:
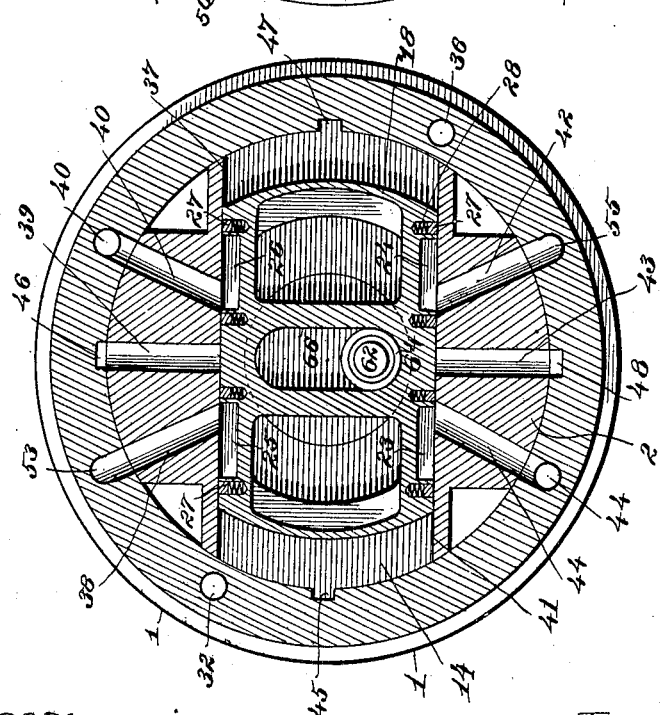

In the drawings Figure 1 is a section of our engine taken on the line A—B; Fig. 2 a plan of our engine with the top plate or head removed; Fig. 3 a section on the line C—D of Fig. 2; Fig. 4 a section on the line E—F of Fig. 2; Fig. 5 a sectional plan on the line G—H of Fig. 1 showing the upper piston at the end of one of its strokes and in such position as to admit motive fluid into one end of the lower chamber and to exhaust it from the other end of that chamber; Fig. 6 a similar view but with the piston in lap position; Fig. 7 a sectional plan on the line I—J of Fig. 1; Fig. 8 a plan of the gear housing and its gears; Fig. 9 a perspective of the casing and its piston chambers and also the piston removed therefrom; Fig. 10 an elevation of our engine; and Figs. 11, 12, and 13 detailed views illustrating the changes necessary to produce a reversible motor, Fig. 12 being taken on the line K—L of Fig. 11, and Fig. 13 being taken on the line M—N of Fig. 12.

For the purpose of affording a definite description and illustration, we have shown our invention embodied in a fluid pressure drill although it will be evident that it is applicable to all uses to which an engine or motor may be put, the necessary slight mechanical changes in details having been made. Furthermore, while any fluid pressure may be employed as the motive fluid, yet for the sake of brevity and without any intention of limitation thereto, compressed air will be hereinafter considered as such fluid.

The engine or motor may be of either the reversible or non reversible type both of which are herein illustrated. Figs. 1 to 10 illustrate the non reversible type while the remaining figures illustrate the necessary changes to adapt the engine or motor for reversing purposes. The construction and operation of the non-reversible motor will be explained first, it being understood that the construction of the reversible motor is the same except in the few particulars hereinafter more fully explained.

The motor is, in the present instance, and referring to the non reversible type, a drill, comprising an outer casing or ring 1 into which is pressed or otherwise secured the cylinder or block 2. A top cap or head 3 closes the upper end of the motor, being secured to the flange 4 of the ring 1 by means of bolts 5 or otherwise, and is provided with a suitable feed screw 6 for feeding the drill to the work in the usual and well known way. To a bottom flange 7 on the ring 1 is secured a disk 8 through whose vertical flange 9 passes the securing bolts 10. The cap 3 and said disk 8 form respectively the upper and lower heads of piston chambers as hereinafter explained. A casing or gear housing 11 closes the lower end of the machine and is provided with a circular flange 12 through which the bolts 10 also pass whereby such housing and disk are firmly secured to the ring.

The cylinder is, in the present instance, a casting or block containing an upper piston chamber 13 and a lower piston chamber 14 besides containing many of the ports and passages hereinafter described. These piston chambers which extend diametrically across the cylinder and at right angles to each other, being milled straight across the block which is turned on its outer circumference, are separated by the web portion or partition 15 of the cylinder except for a central circular opening 16 to accommodate a crank pin, as will be more particularly hereinafter described. Similar flat pistons 17 and 18, corresponding in shape to the shape of the piston chambers except that they are shorter, travel in the upper and lower piston chambers respectively and serve not only as pistons proper but as admission and exhaust valves for each other in a manner to be fully explained. The upper piston has on one of its flat edges the two recesses 19 and 20 and on its opposite edge two similar recesses 21 and 22, while the lower piston is provided with the similar recesses 23, 24, 25 and 26. The pistons may be provided with suitable packing to prevent the passage or leakage of the motive fluid, and, as herein shown the opposite flat edges of the pistons have a metallic packing composed of a suitable number of transversely extending strips 27 which are spring pressed, by means of the springs 28.

Referring more particularly to Fig. 9 where the various ports and passages are clearly depicted in perspective, the piston chamber 13 has a flat side 29, provided with three ports and passages 30, 31 and 32, while the opposite side is provided with three similar ports 34, 35 and 36. The other piston chamber 14 is provided with similarly arranged ports, one side 37 thereof having the ports and passages 38, 39 and 40, while the opposite side 41 has corresponding ports and passages 42, 43 and 44.
By means of suitable connecting passages 45, 46, 47 and 48, here shown as formed in the inner face of the outer ring, the ends of one piston chamber are put in communication with the flat sides of the other piston chamber whereby one piston will govern the admission of pressure to the chamber of the other piston and exhaust such pressure therefrom. For example, the connecting passage 46 connects the right hand end of the upper piston chamber with the port and passage 39 which terminates or opens out upon the center of the flat side 37 of the lower piston chamber. The four passages 32, 36, 40 and 44 are the exhaust passages, which, in the present instance, that is, in the non reversible form of machine, extend downwardly through the ring and disk and empty into the gear chamber or housing, from whence the exhaust escapes through suitable openings 49 preferably covered by a gauze or screen 50. The outer casing or ring has an annular channel or groove forming a ring port 51, having four downwardly extending supply or feed ports and passages 52, 53, 54 and 55 which communicate respectively with the ports and passages 34, 38, 30 and 42. This ring port receives the live air or motive fluid through the main supply or feed port and passage 56 which extends through one of the drill handles and is controlled by a suitable throttle valve 57.
The disk 8 has a suitable crank bearing which is here shown as a central circular depression provided with a central opening in which is preferably fitted a suitable flanged bushing 59, which does not, however, fill such depression but leaves room for a crank disk 60 whose top face does not come quite flush with the top face of the disk so as to avoid frictional contact with the piston thereabove. This crank disk preferably has an oil port 61 so that the oil supply to the central part of the machine, as hereinafter explained, may be fed through said por to the bushing 59 onto which such crank disk bears.
A crank pin 62 is formed on or secured to the crank disk and provided with two separate preferably readily removable or loose bushings or collars 63 and 64, which are here shown as of equal length so that the parting line between them is on the same plane as the partition 15 between the piston chambers. This crank pin and its bushings extend upwardly, being received by slots 65 and 66 in the upper and lower pistons respectively. In the present instance, the crank has no positive connection with either of the pistons whose movements drive or rotate the crank. The slots are provided for the circular movement of the crank pin whose bushings are caused to roll in the slots, thereby reducing the friction to a minimum, the contact being in fact a rolling contact so that the friction is inconsiderable. In case these bushings should become worn they can be removed and others substituted. The driving pinion 67 is provided with a shaft, which, in the form here illustrated, has its upper end 68 screw threaded so as to screw directly onto a tubular extension or shaft 69 of the crank disk. A suitable counterweight or balance 70 is secured to the shaft of the driving pinion diametrically opposite the crank pin so as to balance the latter. The lower end 71 of the driving shaft bears in a bushing 72 which is fitted in the tubular extension 73 of a rotary frame 74. This frame rotates in a bushing 75 fixed in the housing 11 and carries near its inner ends, upon studs 76 the two gears 77 and 78 which mesh in a circular rack 79 formed upon or secured to the inner surface of the gear housing. Obviously when the driving shaft is rotated in the direction indicated by the arrow, the gears will rotate in the direction of the respective arrows upon them, thereby causing a rotation of the said frame in the direction indicated by the arrow applied to it. The frame is thus driven at a slower speed than the driving pinion.

The tubular extension of the rotary frame has a lower bearing which is preferably a ball bearing in the present instance. A ring 80 screws on the tubular extension 81 and is provided with a groove 82 forming a track or way for the balls 83. A nut and ring 84 having a corresponding groove 85 screws onto the lower end of the extension of the rotary frame, onto which end also the chuck 86 for receiving the working tool is secured or otherwise held in operative position.

The operation of the engine or motor just described, that is the non reversible type will be readily understood from the following explanation of a complete cycle or movement of the parts, particular reference being had in this explanation to Fig. 9: Starting with the pistons in the position illustrated in Fig. 2 which shows the upper piston at the limit of one stroke, and the lower piston on lap, the recess 20 of the upper piston has already fully connected passages 34 and 35 whereby the motive fluid will pass from the ring port through passages 52 and 34, recess 20 and passages 35 and 47, and be then admitted to the right hand end (Fig. 9) of the lower chamber, and in the said assumed position of parts, the piston in said lower chamber had already reached the middle of its stroke, that is, it is at lap position because the ports which it governs are now lapped. The opposite recess 22 had also previously connected the two parts and passages 31 and 32 and thereby opened the exhaust from the left hand end of the lower piston chamber. Just as soon, however, as the lower piston, now moving to the left, has traveled sufficiently beyond lap position, its recess 26 will connect ports and passages 39 and 40, thereby exhausting the right hand end of the upper chamber. Simultaneously, the opposite recess 24 will connect the supply passage 42 with passages 43 and 48, thereby admitting live air to the left hand end of the upper piston chamber. The upper piston will thus begin its travel before the lower piston has completed its extreme stroke to the left and before the recesses 24 and 26 have been carried sufficiently far to fully connect the said ports which they govern. When the upper piston has made a half stroke and is consequently on lap, the lower piston has reached the end of its stroke to the left and the crank pin is at one end of the slot in the upper piston and in the middle of the slot of the lower piston. Upon a slight further movement of the upper piston, its recess 21 will connect supply ports and passages 54 and 30 with ports and passages 31 and 45 thereby admitting live air to the left hand end of the lower piston chamber. Simultaneously the recess 19 of the upper piston causes an exhaust of the right hand end of the lower piston chamber by connecting ports and passages 35 and 36. The said ports governed by all of the recesses in both of the pistons become connected to the full extent when the pistons have made their full travel in one direction or the other. At this time, that is, when the upper piston is at its extreme stroke to the right, the lower piston is on lap and moving towards the left while the crank pin is at the center of the slot of the upper piston and at one end of the slot of the lower piston. Slight movement of the lower piston beyond said lapped position will bring its recess 23 in such position as to connect ports and passages 43 and 44 thereby causing an exhaust of pressure from the left hand end of the upper piston chamber while the other recess will connect ports and passages 38 and 39 and admit live air to the right hand end of the upper piston chamber. When the lower piston reaches the end of its right hand stroke, the upper piston has made a half stroke and is on lap, but moving towards the left. At this time, the crank pin is at one end of the slot of the upper piston and at the middle of the slot of the lower piston. Continued movement of the upper piston beyond lap position brings the recess 22 in register with ports and passages 31 and 32 thereby exhausting the pressure from the left hand end of the lower piston while the recess 20 registers with ports and passages 34 and 35 thereby admitting live air to the right hand end of the lower piston chamber. By the time the upper piston reaches the limit of its stroke to the left, the lower piston has reached lap position, while the crank pin is at the center of the slot of the upper piston and at one end of the slot of the lower piston. This completes a full cycle of operation, that is a full double stroke of each piston and a full revolution of the crank, and brings us back to the original relative position of the parts from which we started, the same operation being repeated so long as the engine or motor is running.

When the engine or motor constructed as herein shown, operates a drill, the motion of the crank is transmitted through the gears and connections hereinbefore described. The crank rotates the driving pinion which, by engagement with the two gears traveling around the circular rack, causes rotation of the rotary frame as well as of its gears whereby the working tool carried by the chuck which is fast to the rotary frame is operated. The central open portion of the engine or motor may be abundantly supplied or filled with oil so as to thoroughly lubricate the piston and also the crank bearing through the small oil hole in the crank disk. In order that oil may be readily introduced into the engine or motor, a diagonal hole is tapped into the top head 3 of the casing and a plug 87 screwed therein. This hole terminates substantially central of the motor and the oil supply thereto will run into said central open port of the engine or motor.

In the present instance, the crank is not in positive connection with either of the pistons, but its pin works freely in the slots in such pistons, the friction being reduced to a minimum by providing a rolling frictional contact which is obtained through the use of two separate rotatable bushings on the crank pin. There is one bushing for each piston so that one bushing may rotate in a direction opposite to that of the other according to the particular direction of movement of its piston. In case of any wear or in order to take up any play, a new bushing or bushings of slightly greater outer diameter may be substituted, the construction and arrangement of the engine being such as to readily permit this to be done. The central opening in the web plate or partition between the piston chambers is preferably made of sufficient diameter or size to accommodate the circular movement of the crank pin, such opening, as shown, particularly illustrating the circle described by such pin.

The pistons have a two fold function or capacity, that is, they act not only as pistons proper, but also as cut off valves for each other for the purpose of admitting and exhausting the pressure. Moreover, the relative position of the parts and of the ports is such as to absolutely avoid every possibility of dead centers. As hereinbefore referred to one of the pistons will begin its stroke before the other one has completed its full stroke, and such second named piston will receive its motive fluid before the first named piston has completed its stroke, so that a dead center cannot exist at any time.

The ports and passages opening out into said piston chambers are entirely governed by the recesses in the edges of the respective pistons, the whole work of governing such passages being performed by said recesses. Consequently the piston chambers will have pressure only at the ends, while the central portion of the engine or motor, and consequently the central open portion of the piston will have simply atmospheric pressure.

The engine or motor herein described possesses the many advantages of simplicity and fewness of parts. The number of the movable parts is at a minimum, while the power or energy developed is at a maximum. The engine or motor may be employed for a variety of purposes or uses by simply altering the mechanical construction to adapt it to its particular environments without in any way changing the character or operation of the novel and advantageous features of the herein described construction; for instance, our engine or motor may be used as a motor for automobiles where simplicity, compactness and reliability are necessary considerations: consequently it is to be understood that we contemplate using our invention wherever applicable.

The engine or motor of a reversible type is the same as the non-reversible type as to general construction and operation except that means are provided for connecting the exhaust passages of the non-reversible engine into a single passage and leading that passage into close proximity to the main inlet passage which supplies the live air, so that both of said passages may be governed by a single suitable valve, in the present instance a three-way cock located in advance of the throttling valve. To this end, the outer casing of the engine is also provided with a ring port 88 similar to the top ring port 51 (see Fig. 11) and communicating with what constitute the exhaust passages in a non-reversible type of engine hereinbefore described but which may be either the feed passages or the exhaust passages in the reversible type accordingly as the said cock is turned in one direction or the other. A passage 89 leads from this ring port 88 outwardly through the side of the casing and terminates in a port 90 governed by a suitable three-way cock 91. A passage 92 similar to passage 89 communicates with the ring port 51 and is also governed by said cock 91. The cock is provided with a cross-way 93 for the passage of live air and with a longitudinal groove 94 for the exhaust of the air. When the cock is turned as shown in Fig. 12 the way 93 permits the passage of live air direct to the lower ring port 88 whereby the engine will rotate in a direction the reverse of that hereinbefore described in relation to the device of Figs. 1 to 10. The exhaust will pass through the ring port 51, through the passage 92 and finally will be vented through the groove 94 in the cock. To reverse the engine or motor and cause it to rotate in a contrary direction, the cock is turned to connect the passage 92 with the live air and the passage 89 with the exhaust. So far as the operations of the reversible type of motor shown in Figs. 11, 12, and 13 are concerned, they are identical with the operations hereinbefore explained in relation to the non-reversible form of engine or motor except, of course, the movements of the parts are exactly the reverse when the machine is reversed in direction in comparison with the direction of rotation described in connection with said Figs. 1 to 10.

We claim:

1. An engine or motor comprising two piston chambers separated by a partition or diaphragm having a central opening to accommodate a crank pin, separate and physically independent pistons operating in said chambers and having means for admitting and releasing fluid pressure to and from each other, and a crank pin loosely engaged and driven by said pistons and passing through said diaphragm opening; substantially as described.

2. An engine or motor comprising two piston chambers, ports and passages leading thereto and therefrom for admission and exhaust of pressure, separate and physically independent pistons therein for governing said ports and passages and acting as cut-off valves for each other, and crank mechanism loosely engaged and driven by said pistons; substantially as described.

3. An engine or motor comprising a plurality of piston chambers with communicating passages, a plurality of pistons, one for each chamber, and arranged to govern said passages whereby said pistons act as cut-off valves for each other, and a single crank pin extending through all the pistons and driven thereby; substantially as described.

4. An engine or motor comprising a plurality of independent and flat double acting pistons working in separate chambers and each acting as a cut-off valve for the other, each piston being provided with a central transverse slot of a width slightly greater than the diameter of the crank pin, and a crank pin working in said slots and loosely engaged thereby; substantially as described.

5. An engine or motor comprising a plurality of independent pistons movable in chambers arranged in different but parallel planes and at right angles to each other, said pistons being double acting and arranged to act as cut off valves for each other, and a crank pin or shaft extending through the pistons and loosely engaging the same; substantially as described.

6. An engine or motor comprising a plurality of flat pistons movable in separate chambers having intercommunicating ports and passages, said pistons having on their opposite sides means for governing said ports and passages whereby said pistons act as valves for each other, and a crank pin or shaft actuated by said pistons; substantially as described.

7. An engine or motor comprising two flat pistons movable in separate chambers arranged in parallel planes but at right angles to each other, each chamber having on its opposite sides ports or passages communicating with the ends of the other chamber, said pistons having recesses on their opposite sides for governing said ports and each having a central slot, and a crank pin loosely received by the slot of the pistons and driven by the movements of such pistons; substantially as described.

8. An engine or motor comprising a plurality of physically independent pistons movable at right angles to each other and in parallel planes and provided with central transverse slots, separate piston chambers with ports and passages leading thereto and therefrom for admission and exhaust of pressure, said pistons being adapted to govern said ports and passages and acting as cut-off valves for each other, and a crank pin or shaft loosely working in said slots; substantially as described.

9. An engine or motor comprising a plurality of physically independent pistons movable at right angles to each other and in parallel planes and provided with transverse slots, chambers arranged for said pistons and having ports and passages leading to and from said chambers and governed by said pistons, one of the said pistons acting as a cut off valve for another piston, and a crank pin or shaft loosely working in said slots; substantially as described.

10. An engine or motor comprising a plurality of pistons working in separate chambers and each having a central transverse slot, a crank pin or shaft, and a plurality of separate bushings loosely and rotatably arranged on said pin, one bushing for each piston and each bushing substantially corresponding in length to the width of its piston, said slots in the pistons having a width substantially equal to the outside diameter of the bushings, whereby each bushing has a rolling frictional engagement with its piston; substantially as described.

11. An engine or motor comprising a plurality of pistons working in separate chambers and provided with slots, a crank pin or shaft working in said slots, and a plurality of separate bushings loosely arranged on said pin to rotate thereon, one bushing for each piston; substantially as described.

12. An engine or motor comprising a plurality of pistons working in separate chambers which are arranged in parallel planes but at right angles to each other, said pistons each having a transverse central slot, a crank pin or shaft working in all of said slots and a plurality of separate bushings one for each slot and arranged on said pin to rotate thereon and thereby afford rolling contact with the slot; substantially as described.

13. An engine or motor comprising a plurality of flat pistons operating in separate piston chambers and provided with continuous edges except for recesses on two opposite sides, piston chambers arranged for said pistons and having in two opposite side walls ports and passages governed by the recesses in said pistons, and means for converting the reciprocating movement of the pistons; substantially as described.

14. An engine or motor comprising a plurality of flat pistons operating in separate substantially rectangular chambers, each consisting of a framework with continuous edges unbroken except for side recesses and having an open center, chambers in which the pistons work and having in its walls ports and passages governed by said pistons and means for converting the reciprocating movement of the pistons; substantially as described.

15. An engine or motor comprising a casing having a plurality of chambers each having on its opposite sides three ports, a feed port, an exhaust port and a port to another chamber, pistons traveling in said chambers and having recesses on two opposite edges to govern said ports and also having a transverse slot, and a crank whose shaft or pin works in the slots of the piston; substantially as described.

16. An engine or motor comprising a casing having a plurality of chambers communicating at the center, pistons working therein, a plate closing the top of the casing and having an oil hole extending therethrough for discharging oil to the central portions of the pistons and casing and a plug or closure for said hole; substantially as described.

17. An engine or motor comprising a casing containing a plurality of chambers, pistons therein, a top and bottom head for said casing, one of said heads being outwardly pressed to form a crank bearing and a crank having a disk which bears in said bearing and a pin which coöperates with said pistons; substantially as described.

18. An engine or motor comprising a casing containing a plurality of chambers, pistons therein, a top and bottom head for said casing, the bottom head being centrally depressed to form a socket or bearing, a flanged bushing fixed in said bearing but not filling such socket, a crank disk arranged to rotate in said bushing and substantially filling such socket, and a crank pin mounted on said disk and coöperating with the pistons; substantially as described.

19. An engine or motor comprising a casing containing a plurality of chambers, pistons therein, top and bottom heads for said casing for closing said chambers, one of said heads being centrally depressed to form a bearing, a crank disk arranged to rotate in said bearing and provided with an oil port to carry oil from the center of said chambers to the crank bearing, and a crank pin coöperating with said pistons; substantially as described.

20. An engine or motor comprising an outer ring having a ring port, a block 2, having two piston chambers each with two feed ports communicating with the ring port, two ports communicating with the exhaust and two cylinder ports and passages, one at each end, communicating with a third series of two ports communicating with the next or neighboring chamber, said cylinder ports and passages extending through the said outer ring and into an adjacent chamber; substantially as described.

21. An engine or motor comprising a plurality of chambers, flat pistons working therein, each piston comprising a continuous frame having a central cross-bar provided with a slot, ports and passages leading to and from said chambers and governed by said pistons, and a crank whose pin works in the slots of the pistons; substantially as described.

22. An engine or motor comprising chambers 13 and 14 separated by the partition 15 except for a central opening 16 to accommodate a crank pin, flat pistons 17 and 18 in said chambers respectively and having slots 65 and 66 respectively, a crank disk 60 having a crank pin 62 working in said slots and separate bushings 63 and 64 arranged on said pin with their parting line in the plane of the said partition; substantially as described.

23. An engine comprising an outer ring 1 having a ring feed port, a block 2 having piston chambers and also ports and passages communicating with said ring port and with an exhaust, pistons in said chambers, a crank coöperating with said pistons, a top head 3 secured to the ring 1, a bottom head 8 having a vertical flange 9, a housing 11, bolts 10 for securing said housing and head 8 to the ring 1 and gearing arranged within said housing and actuated by said crank; substantially as described.

24. An engine comprising an outer ring 1 having a ring feed port, a block 2 having piston chambers 13 and 14 each having two feed ports communicating with the ring port, chamber 13 having on one side its feed port 30 and on the opposite side the feed port 34 while chamber 14 has similar ports 38 and 42; chamber 13 also having exhaust ports 32 and 36 and chamber 14 exhaust ports 40 and 44, said ring having the four passages 45, 46, 47, and 48, passages 45 and 47 communicating with chamber 14 and 46 and 48 with chamber 13, ports and passages 31 and 35 connecting ports and passages 45 and 47 with chamber 13 and passages 39 and 43 connecting ports and passages 39 and 43 with chamber 14, and two flat pistons working in said chambers and provided with two recesses on two opposite flat edges for governing said ports; substantially as described.

25. A reversible engine or motor comprising a casing having a plurality of piston chambers in different parallel planes and also having two ring ports communicating with said chambers, valve mechanism for connecting either one or the other of said ring ports with the motive fluid supply or with the atmosphere, pistons movable in said chambers and means for transmitting the motion of said pistons; substantially as described.

26. A reversible engine or motor comprising a casing containing a plurality of piston chambers in different parallel planes and provided with two ring ports communicating with said chambers and terminating in ports in close proximity to each other, valve mechanism for governing said ports and connecting one or the other thereof either with the supply of motive fluid or with the atmosphere, accordingly as the engine is to be run in the one direction or the other, and pistons movable in said chambers; substantially as described.

27. A reversible engine or motor comprising a casing having a plurality of piston chambers and also having the ring ports 51 and 88, the ring port 51 having a passage 92 leading outwardly and the ring port 88 having a similar port and passage 89, a cock having a way 93 and a groove 94 and adapted to govern said ports and passages 89 and 92, and pistons working in said chambers; substantially as described.

28. A reversible engine or motor comprising an outer ring or casing having a ring port on its upper and lower faces, ports and passages communicating with said ring ports from the exterior of the casing or with a supply of motive fluid, a reversing valve for said ports and passages, a block or cylinder located within said outer ring and containing a plurality of piston chambers working in different planes and having ports and passages communicating with said ring ports and also communicating with each other, and pistons working in said chambers and acting both as pistons proper and as valves governing the ports leading to an adjacent chamber; substantially as described.

29. A reversible engine or motor comprising an outer ring or casing having a ring port on its upper and lower faces, passages communicating with said ring ports and extending outwardly and being adapted to be put into communication with either the supply of motive fluid or with the atmosphere, a valve mechanism controlling said passages and adapted to put either one or the other of said ring ports in communication with the supply of motive fluid, a block or cylinder having a plurality of piston chambers communicating with each other and with said ring ports, pistons working in said chambers and acting both as pistons proper and as cut off valves, a top plate or head secured to said outer ring and forming the top wall of the upper ring port, and a lower plate or head secured to said outer ring and forming a wall of the lower ring port; substantially as described.

30. An engine or motor comprising an outer ring having ring ports on its upper and lower faces, means for connecting one or the other of said ring ports with the supply of motive fluid and the other ring port with the atmosphere, a block or cylinder within said outer ring and containing piston chambers arranged in different planes and communicating with each other and also with said ring ports, pistons working in said chambers and operating both as pistons and as cut off valves, a top plate or head secured to the outer ring and closing the top of the uppermost chamber and also the top of the upper ring port, a disk or lower head secured to the bottom of the outer ring and closing the lowermost chamber and also the lower side of the lower ring port, crank bearings in said lower head, and a crank mounted in said bearings and having a pin coöperating with said pistons; substantially as described.

31. An engine or motor comprising a casing containing two piston chambers at right angles to each other, each chamber having on its opposite sides central ports leading to the opposite ends of the other chamber and having on each side of such central ports oppositely arranged supply and exhaust ports, reciprocating pistons traveling in said chambers, each piston being provided on each of its opposite sides with two recesses, two of which when the piston is near one end of its travel connect a supply and an exhaust port on opposite sides of the piston chamber with the two central ports leading to the opposite ends of the other piston chamber, and the other two of which when the piston is near the other end of its travel connect the other supply and exhaust ports reversely with the ends of such other piston chamber, and means for transmitting the motion of the pistons with a difference of one-fourth of a cycle between them in their reciprocating movements; substantially as described.

32. An engine or motor comprising a casing containing two piston chambers, each chamber having two central ports out of longitudinal alinement with each other leading to the opposite ends of the other chamber and having in longitudinal alinement with each of said central ports and on each side thereof reversely arranged supply and exhaust ports, reciprocating pistons traveling in said chambers, each piston being provided with two pairs of recesses, the recesses of each pair being in longitudinal alinement with each other and the pairs of recesses being respectively in longitudinal alinement with the two central ports and the supply and exhaust ports on each side of each central port, two of said recesses, when the piston is near one end of its travel, connecting a supply port with one central port leading to one end of the other piston chamber and an exhaust port with the other central port leading to the other end of the other piston chamber, and the other two of said recesses, when the piston is near the opposite end of its travel, connecting the other supply port and other exhaust port reversely with the ends of such other piston chamber, and means for transmitting the motion of the pistons with a difference of one-fourth of a cycle between them in their reciprocating movement; substantially as described.

WILLIAM O. DUNTLEY.
GEORGE H. HAYES.

Witnesses to the signature of said William O. Duntley:
SAMUEL E. HIBBEN,
HENRY R. KENT.

Witnesses to the signature of said George H. Hayes:
GERTRUDE CRAP,
EDWIN STEARNE.